United States Patent
Herbstman et al.

Patent Number: 5,929,867
Date of Patent: Jul. 27, 1999

[54] FLOATING KEYFRAMES

[75] Inventors: David F. Herbstman, Seattle, Wash.;
David P. Simons, Lynnfield, Mass.;
Scott S. Snibbe, Seattle, Wash.

[73] Assignee: Adobe System Incorporated, San Jose, Calif.

[21] Appl. No.: 08/693,941

[22] Filed: Aug. 7, 1996

[51] Int. Cl.$^6$ .................................................. G06F 13/00
[52] U.S. Cl. ........................................................ 345/474
[58] Field of Search ................................ 395/173–175, 395/951, 135; 345/473–475, 435, 951

[56] References Cited

U.S. PATENT DOCUMENTS

| | | | |
|---|---|---|---|
| 5,053,760 | 10/1991 | Frasier et al. | 340/725 |
| 5,267,334 | 11/1993 | Normille et al. | 382/56 |
| 5,594,856 | 1/1997 | Girard | 395/173 |
| 5,619,628 | 4/1997 | Fujita et al. | 395/127 |

OTHER PUBLICATIONS

Corel Corporation, "CorelDraw!4.0: CorelMOVE", "Section 3, Chapter 6: Adding Action", "Chapter 7: Editing and Playing the Animation", pp. 460–463, 481, 1993.

Thobie, Sophie–Anne, "An Advanced Interpolation for Synthetical Animation", IEEE, pp. 562–565, 1994.

Yoshikawa et al., "Synthesizing Human Motion in a CG Authoring Environment for Nonprofessionals", IEEE pp. 40–43, 1996.

Calvert, Ovans, Mah, "Towards the Autonomous Animation of Multiple Human Figures", IEEE, pp. 69–74, 1994.

Fishwick, Porr, "Using Discrete Event Modeling for Effective Computer Animation Control", IEEE, pp. 1156–1162, 1991.

*Primary Examiner*—Mark K. Zimmerman
*Assistant Examiner*—Motilewa A. Good-Johnson
*Attorney, Agent, or Firm*—Fish & Richardson P.C.

[57] ABSTRACT

A computer-implemented method and apparatus for animating a property (such as the position of an object) using floating keyframes to selectively decouple property space and time constraints. Fixed keyframes and floating keyframes may used to specify a path through an n-dimensional property space, but the motion along the path is controlled only by the fixed keyframes. The timing of the floating keyframes is determined by temporal attributes of the nearest fixed keyframes.

14 Claims, 9 Drawing Sheets

Path Q

Motor Control Function S

Path Q

FLOATING KEYFRAMES

BACKGROUND

The present invention relates generally to a method and apparatus for animation in a movie system and more particularly to a method and apparatus for achieving smooth animation effects by selectively decoupling space and time constraints. Programmed computer systems can be used to create, edit, and display movies. Such systems often provide the user with the ability to animate graphics elements by causing them to move or change over time. An example of a program for such a system is After Effects, available from Adobe Systems Incorporated of Mountain View, Calif. Using such systems, a user can create a movie by importing footage such as images, digitized video, or photographs. Each piece of footage is placed into a layer and each layer has properties associated with it such as position, color, opacity, rotation, and size. The user can animate a layer by changing the values of its properties over time. For example, a user can make a layer move across a screen, change color, rotate, or change size.

SUMMARY OF THE INVENTION

In general, in one aspect, the invention features a computer-implemented method and apparatus for animating a property (such as the position of an object) using floating keyframes to selectively decouple property space and time constraints. Fixed keyframes and floating keyframes may used to specify a path through an n-dimensional property space, but the motion along the path is controlled only by the fixed keyframes. The timing of the floating keyframes is determined by temporal attributes of the nearest fixed keyframes.

Advantages of the present invention include the following. The invention provides a simplified method for achieving smooth animation across several path segments in a property space. In addition, the invention provides a simplified method for making changes in animation across several path segments in a property space. Other advantages and features will be apparent from the following description and from the claims.

DETAILED DESCRIPTION

Figure 1:
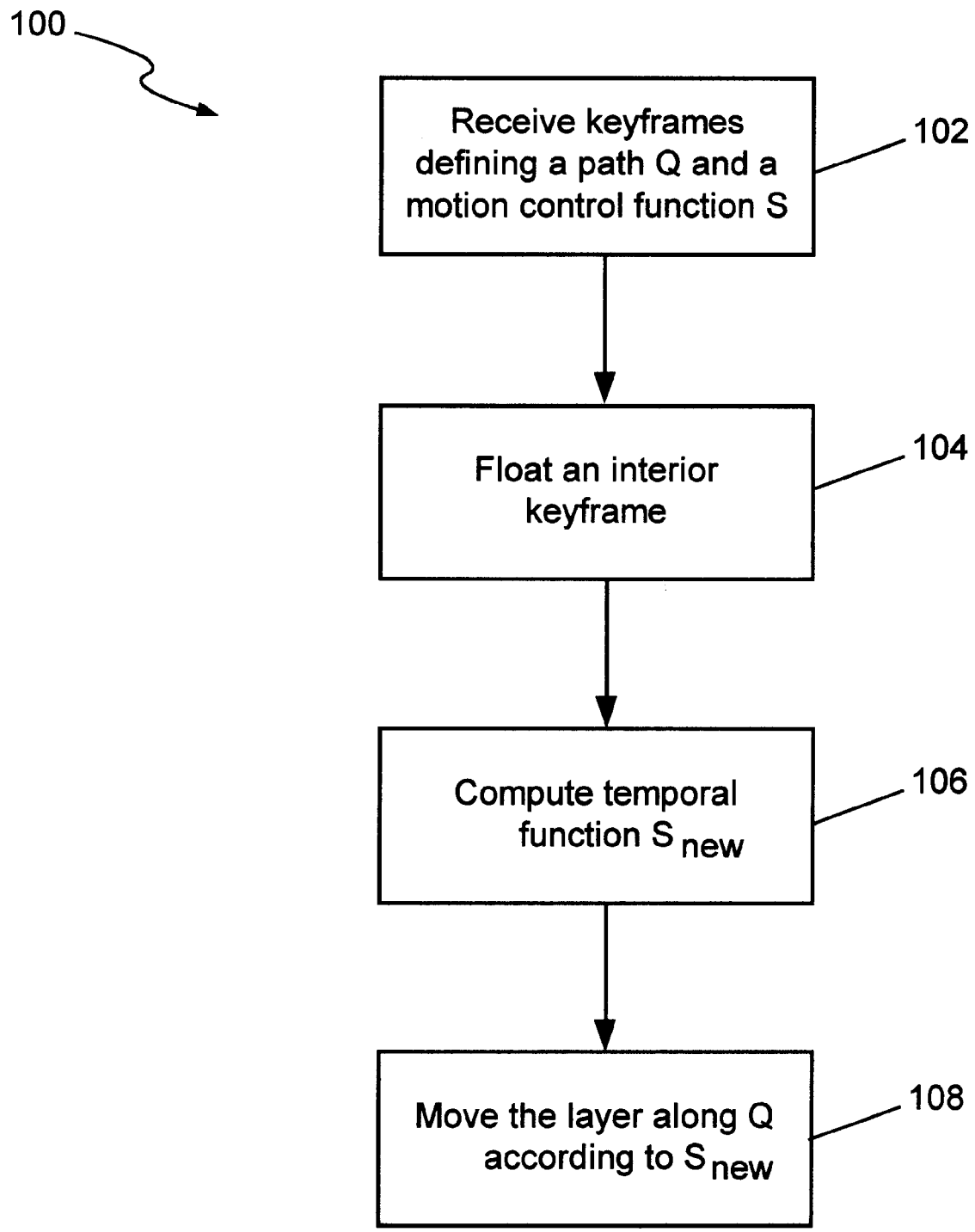
FIG. 1 is a flowchart of a method for animating a layer (graphics object) using floating keyframes.

In a movie system, two functions, Q and S, are used to control changes in layer properties over time. Q defines a path through an n-dimensional property space and S defines the motion along the path. The shape of these functions are controlled by keyframes. A keyframe is a set of attributes associated with a particular point in a space. A method for creating keyframes is discussed in the commonly-owned U.S. patent application entitled "Defining a Time-Variable Property in Digital Compositions," filed on Aug. 7, 1996. Two types of keyframes are fixed keyframes and floating keyframes.

A fixed keyframe is a keyframe that has spatial attributes that control the shape of Q and temporal attributes that control the shape of S. Two or more fixed keyframes define both a path Q and a motion control function S. In the embodiment to be described, the spatial attributes of a fixed keyframe are a pair of control points of a Bezier curve. These control points are an interpolation point (through which the curve passes) and its tangent vector. The temporal attributes of a fixed keyframe in the embodiment to be described are also a pair of control points of a Bezier curve consisting of an interpolation point (through which the curve passes) and its tangent vector. By changing the spatial and temporal parameters, through a graphical user interface (GUI), for example, a user can control the shape of Q and S.

A floating keyframe is a keyframe that has spatial attributes that control the shape of Q, but no temporal attributes. In the embodiment to be described, the spatial attributes of a floating keyframe are the same as those of a fixed keyframe as described above. A floating keyframe in conjunction with other keyframes defines a path Q in the space, but does not influence motion along that path. More than one floating keyframe may be found between a pair of fixed keyframes.

To animate a layer property, the user creates at least two fixed keyframes. The first fixed keyframe sets the value of the layer property at a first time and the second fixed keyframe specifies the value of that same property at a second time. The system will construct a path Q between the two property values and a motion control function S between the two time values. The user can then modify the spatial and temporal attributes of these fixed keyframes or add additional keyframes. When the user desires to animate the change, the system uses path Q and motion control function S to interpolate the value of the layer property for all the frames between the two keyframes. For example, to achieve motion of a layer across a screen, a user creates a fixed keyframe at a first time which sets the layer's position property to an initial position. The user then creates a second fixed keyframe at a second time which sets the layer's position property to its next position. When instructed to animate the change, the system calculates the position of the layer at each of the intermediate times and moves the layer to each of those positions, thereby producing motion of the layer from the starting to the ending positions. Users can create any number of keyframes for each property, and interpolation is accomplished in the same manner between each pair of adjacent keyframes.

Figure 2A:
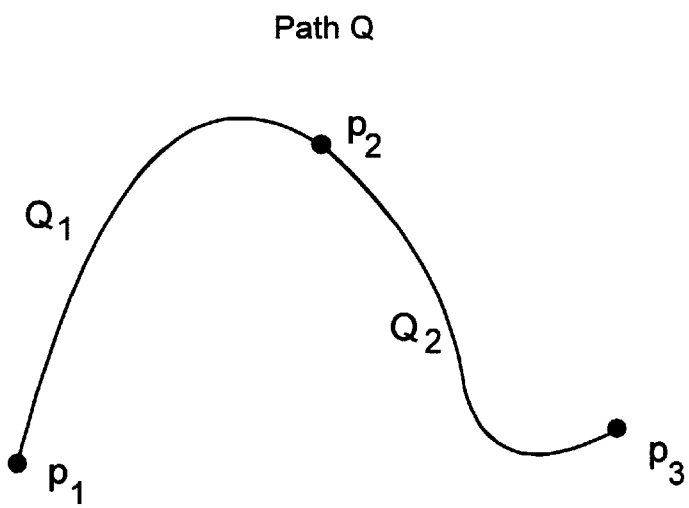
FIG. 2a is a graph of a path Q defined by three fixed keyframes.

Referring to FIG. 1, in a method 100 of animating a layer, the system receives (102) three or more fixed keyframes that define a path Q through a property space and a motion control function S. FIG. 2a shows an example path Q defined by three fixed keyframes. When the property space is a 2D position space, path Q represents the path that a layer will follow as it moves on the screen from point $p_1$ to point $p_3$. Path Q is defined by a first fixed keyframe which places the path at point $p_1$ at a time $t_1$; a second keyframe, at point $p_2$ at a time $t_2$; and a third keyframe, at point $p_3$ at a time $t_3$. The segments $Q_1$ and $Q_2$ between the keyframes are created by the system using, for example, Bezier curves based on the user- or system-defined spatial attributes. Through a GUI, the user can adjust the shape of the segments by using the control points associated with each keyframe. When animated, the layer will move from point $p_1$ at time $t_1$ to point $p_3$ at time $t_3$ along the path segments $Q_1$ and $Q_2$.

Figure 2B:
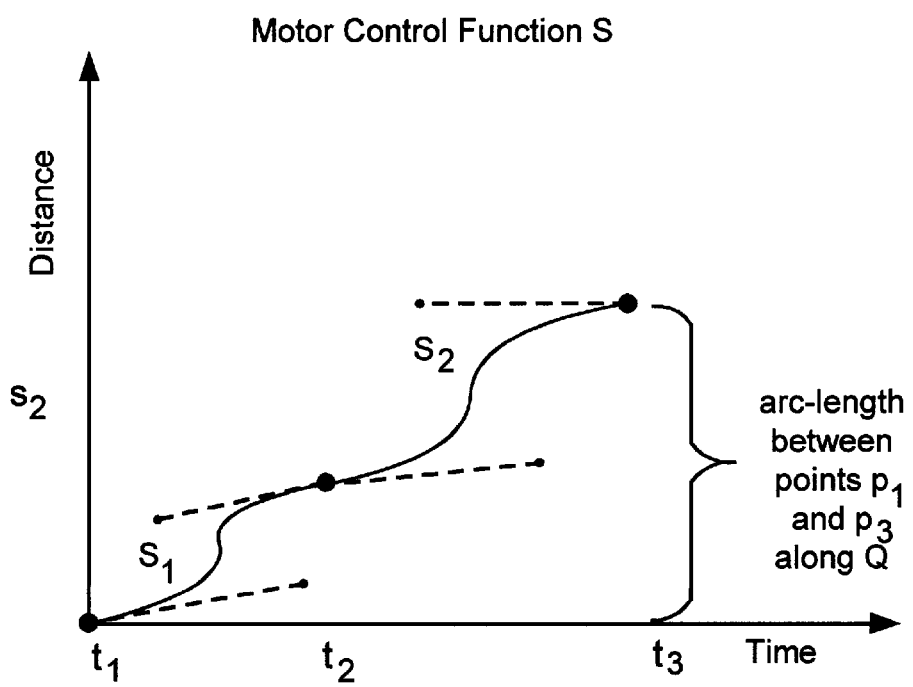
FIG. 2b is a graph of a motion control function S defined by three fixed keyframes.

Referring to FIG. 2b, the three keyframes also define a motion control function S that controls motion of the layer along path Q. In one embodiment, motion control function S corresponds to arc-length distance along path Q as a function of time. In other embodiments, motion control function S can correspond to velocity as a function of time, acceleration as a function of time, or any other function capable of defining motion along path Q. In an embodiment in which S corresponds to arc-length distance as a function of time, each path segment $Q_m$ has a corresponding motion control function segment $S_m$ that specifies the arc-length distance along the path segment $Q_m$ as a function of time. The shape of each motion control function segment $S_m$ is defined by the temporal attributes of the fixed keyframes at the two ends of the segment. In one embodiment, each function segment is a Bezier curve where the attributes are time, velocity, and influence. The velocity attribute refers to the slope of the tangent vector at a keyframe and corresponds to the speed into and out of a keyframe. The influence attribute refers to the length of the tangent vector and corresponds to the amount of control one keyframe exerts over a motion control function segment $S_m$. The user may adjust these attributes on a velocity versus time graph provided through a graphical user interface and by so doing define the shape of S. Each fixed keyframe, except the first and last, has associated with it temporal attributes affecting the interpolation in both temporal directions. The end keyframes need attributes for only one direction.

A user can easily achieve smooth movement across several path segments by converting a fixed keyframe into a floating keyframe. A floating keyframe is a keyframe in which the spatial attributes (e.g., property value and Bezier controls) are specified, but in which the temporal attributes (e.g., time value, velocity, and influence) are allowed to float. A fixed keyframe can be converted into a floating keyframe by releasing control over its temporal attributes. The system will calculate a floating keyframe's time value based on the motion control function between the two fixed keyframes adjacent to the floating keyframe.

Figure 3A:
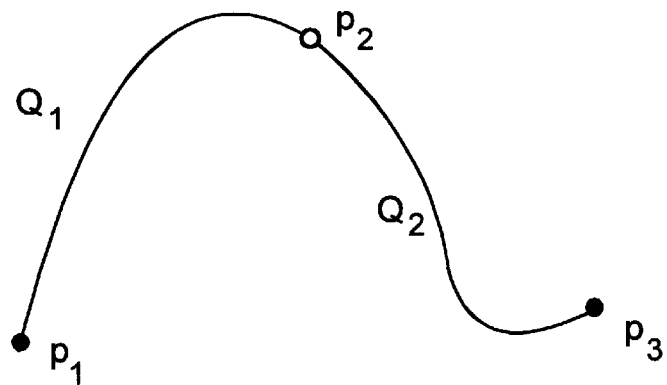
FIG. 3a is a graph of a path Q defined by two fixed keyframes and one floating keyframe.
Figure 3B:
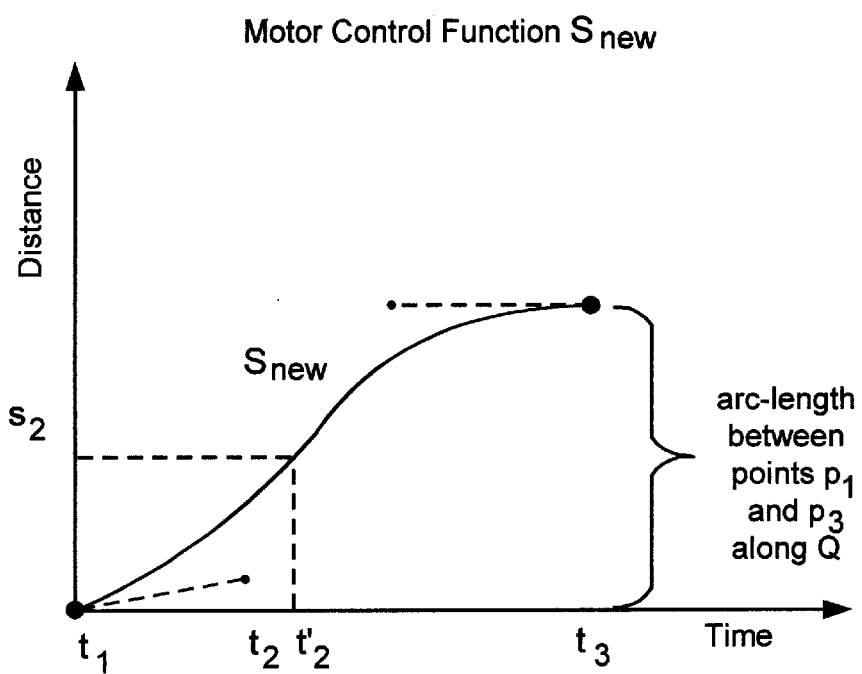
FIG. 3b is a graph of a motion control function $S_{new}$ defined by two fixed keyframes.

Referring again to FIG. 1, after the system has received three keyframes defining a path Q and a motion control function S (102), the system floats an interior keyframe (104), in response to a user request, for example. When the keyframe at point $p_2$ is designated a floating keyframe, a path and motion control function such as is shown in FIG. 3a and FIG. 3b, respectively, may result. Path Q remains unchanged. However, the system computes (106) a new motion control function $S_{new}$ by ignoring the temporal attributes for the floating keyframe at point $p_2$. The shape of the new motion control function $S_{new}$ is determined by the temporal attributes at the keyframes for points $p_1$ and $p_3$. The layer will still pass through point $p_2$ but the time $t_2'$ at which the layer passes through this point will be determined by the shape of the motion control function as defined by the attributes at the adjacent fixed keyframes. The time the layer passes through $p_2$ can be calculated by mapping arc-length distance to time so that $t_2' = S_{new}^{-1}(s_2)$ where $s_2$ corresponds to the arc-length distance along path Q from point $p_1$ to point $p_2$. The arc-length distance between two points can be calculated using a method described in the commonly-owned patent application entitled "Arc-Length Reparameterization," filed Aug. 7, 1996, which is incorporated herein by reference. Allowing the adjacent fixed keyframes to control the motion of an interior keyframe simplifies motion control across several path segments.

Figure 4:
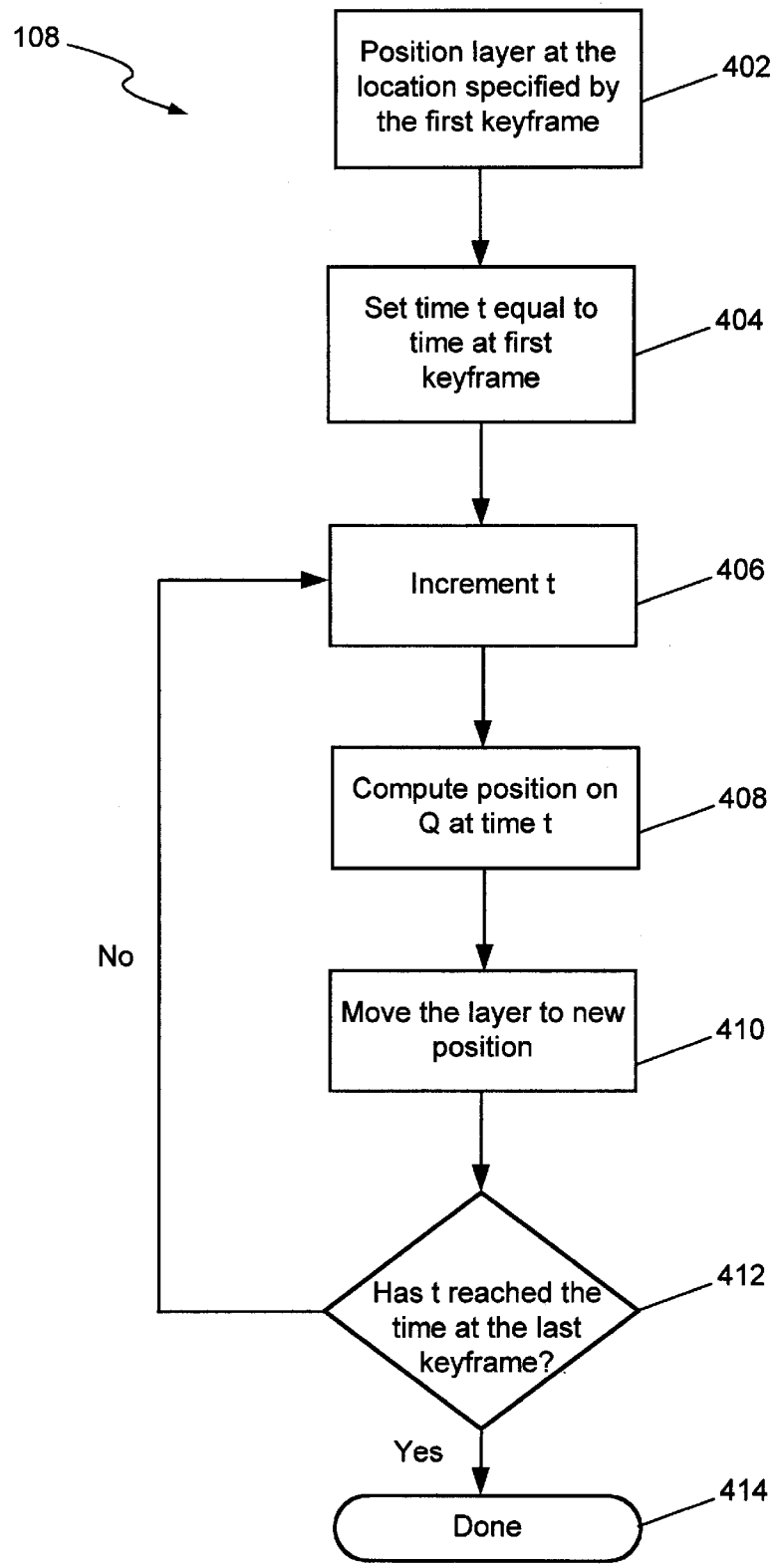
FIG. 4 is a flow chart of a method for moving a layer along path Q according to motion control function $S_{new}$.

Referring to FIG. 4, the system animates the change in the layer property by moving the layer along path Q according to the newly computed motion control function $S_{new}$ (108). The system positions (402) the layer at the location in the property space specified by the first fixed keyframe. The system sets a time t (404) to the time associated with the first keyframe and then increments t (406) to a next time and computes the position on path Q at time t (408).

Figure 5:
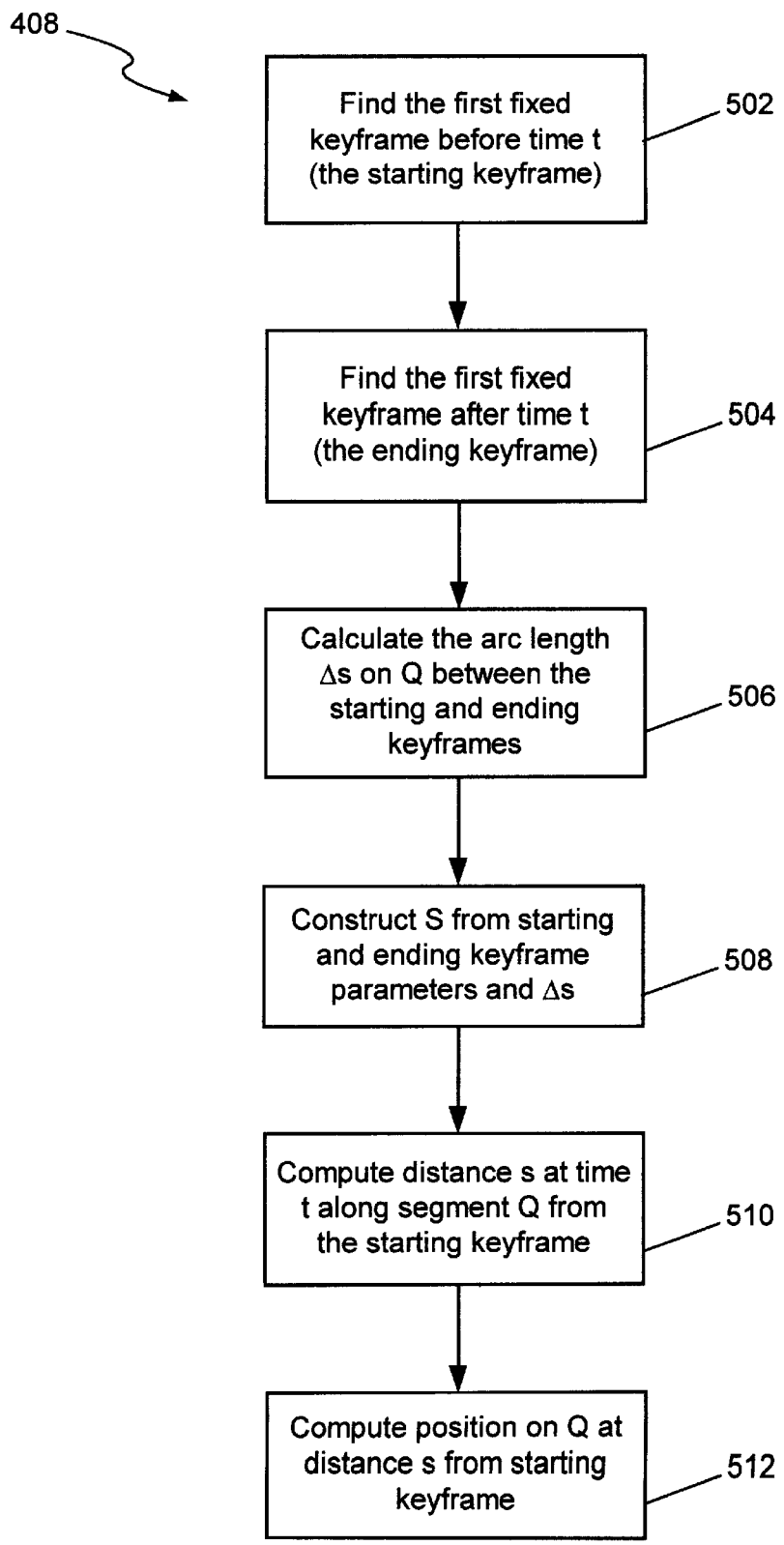
FIG. 5 is a flow chart of a method for computing the position on Q at time t.

Referring to FIG. 5, to compute the position on path Q at time t (408), the system finds the first fixed keyframe before time t (the "starting keyframe") (502) and the first fixed keyframe after time t (the "ending keyframe") (504). The system calculates (506) the arc-length Δs on path Q between the starting keyframe and the ending keyframe. The system uses Δs and the temporal attributes at the starting and ending keyframes to construct a curve, e.g., a Bezier curve, for the motion control function S between the starting and ending keyframes (508). The system uses S to compute at a time t the distance s traveled along path Q from the starting keyframe (510). The system then computes (512) the position on path Q at distance s from the starting keyframe using arc-length reparameterization. Arc-length reparameterization is a method of compensating for uneven arc-lengths per unit parameter in parametric curves (such as Bezier curves) used in animation systems. This method is described in the commonly-owned patent application entitled "Arc-Length Reparameterization," incorporated by reference above.

Returning to FIG. 4, after calculating the position on path Q, the system moves the layer to this position (410). The system checks if t has reached the time associated with the last keyframe (412). If so, the animation is complete (414). If not, the system loops back to increment (406) t and compute the next position (408).

Having created floating keyframes in accordance with the method described above, a user desiring to add more detailed control over the timing of a property change, can unfloat a floating keyframe. A keyframe can be unfloated by activating its temporal attributes and recomputing motion control function S. In the embodiment discussed above, this corresponds to activating the keyframe's time value, velocity, and influence parameters. The shape of the motion control function segments on either side of the keyframe will then be controlled by the keyframe's own temporal attributes rather than by the attributes of the adjacent fixed keyframes.

Figure 6:
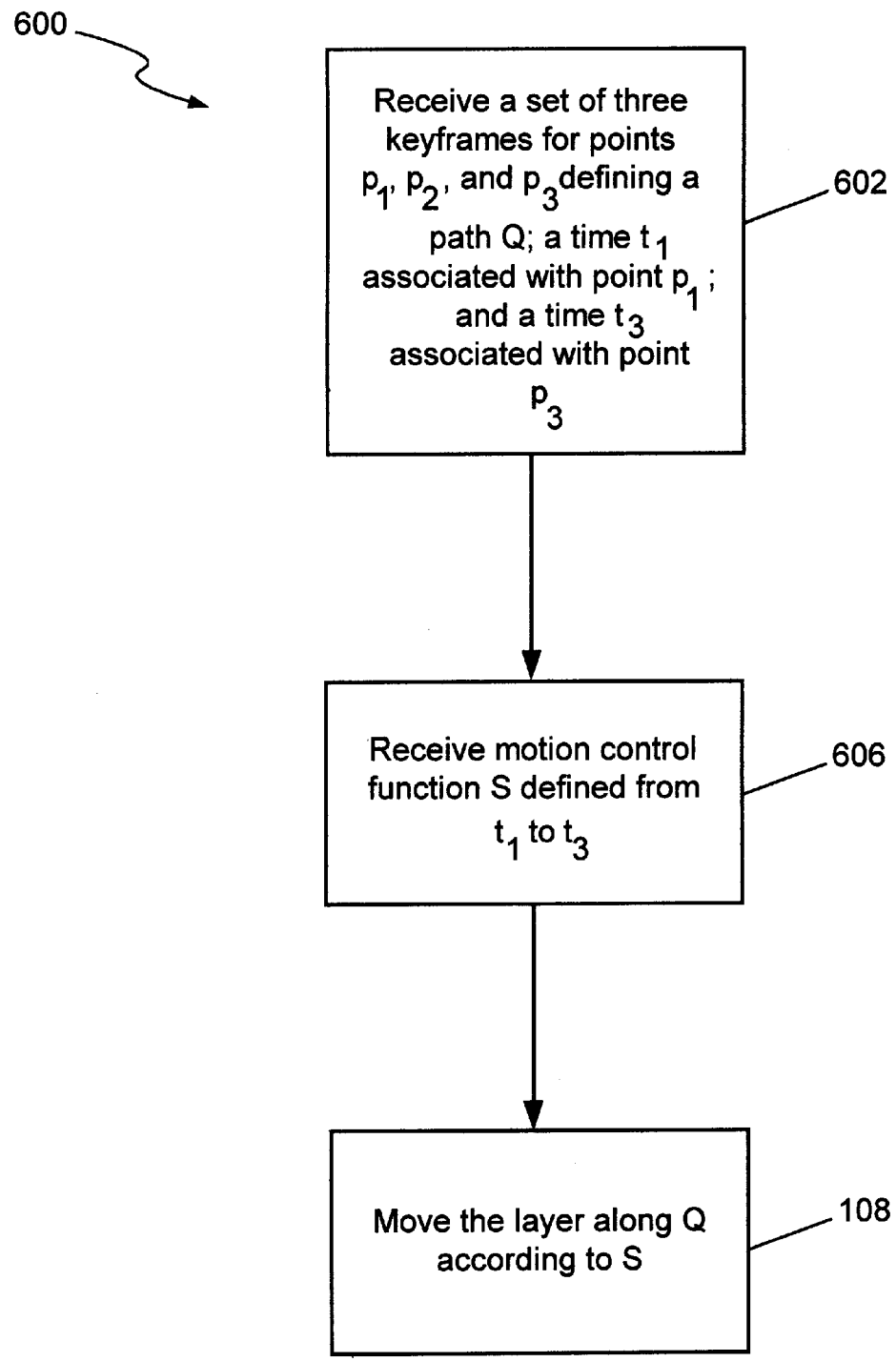
FIG. 6 is a flow chart of a method for animating a layer using floating keyframes.
Figure 7:
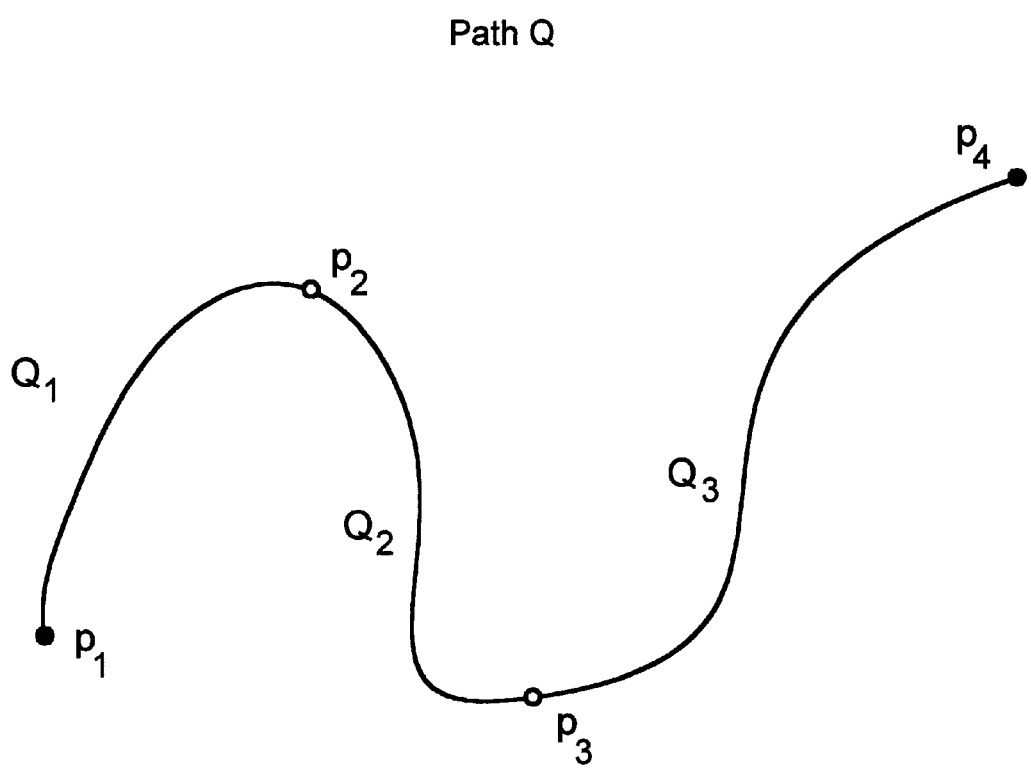
FIG. 7 is a graph of a path Q defined by two fixed keyframes and two floating keyframes.

Referring to FIG. 6, in an alternative embodiment (600), animation of an object may be controlled without linking a property value to an intermediate time value. The system receives (602) a set of three keyframes for points $p_1$, $p_2$, and $p_3$ specified by the user that define a path Q for a layer, and a time $t_1$ associated with point $p_1$, and a time $t_3$, associated with point $p_3$. The user defines (606) a motion control function S which specifies the timing of the motion along path Q from point $p_1$ at time $t_1$ to point $p_3$ at time $t_3$, passing through point $p_2$ at some time determined by the shape of motion control function S. The system then moves (108) the layer along path Q according to motion control function S.

The methods discussed above may be applied to any number of interior keyframes in a path. For example, FIG.

7 shows a path in which two interior keyframes at points $p_2$ and $p_3$ have been allowed to float. As in the case of a single floating keyframe, the time at which the path passes through each of the several floating keyframes will be determined by the shape of the motion control function as controlled exclusively by the nearest fixed keyframe on each side of the floating keyframe.

Figure 8:
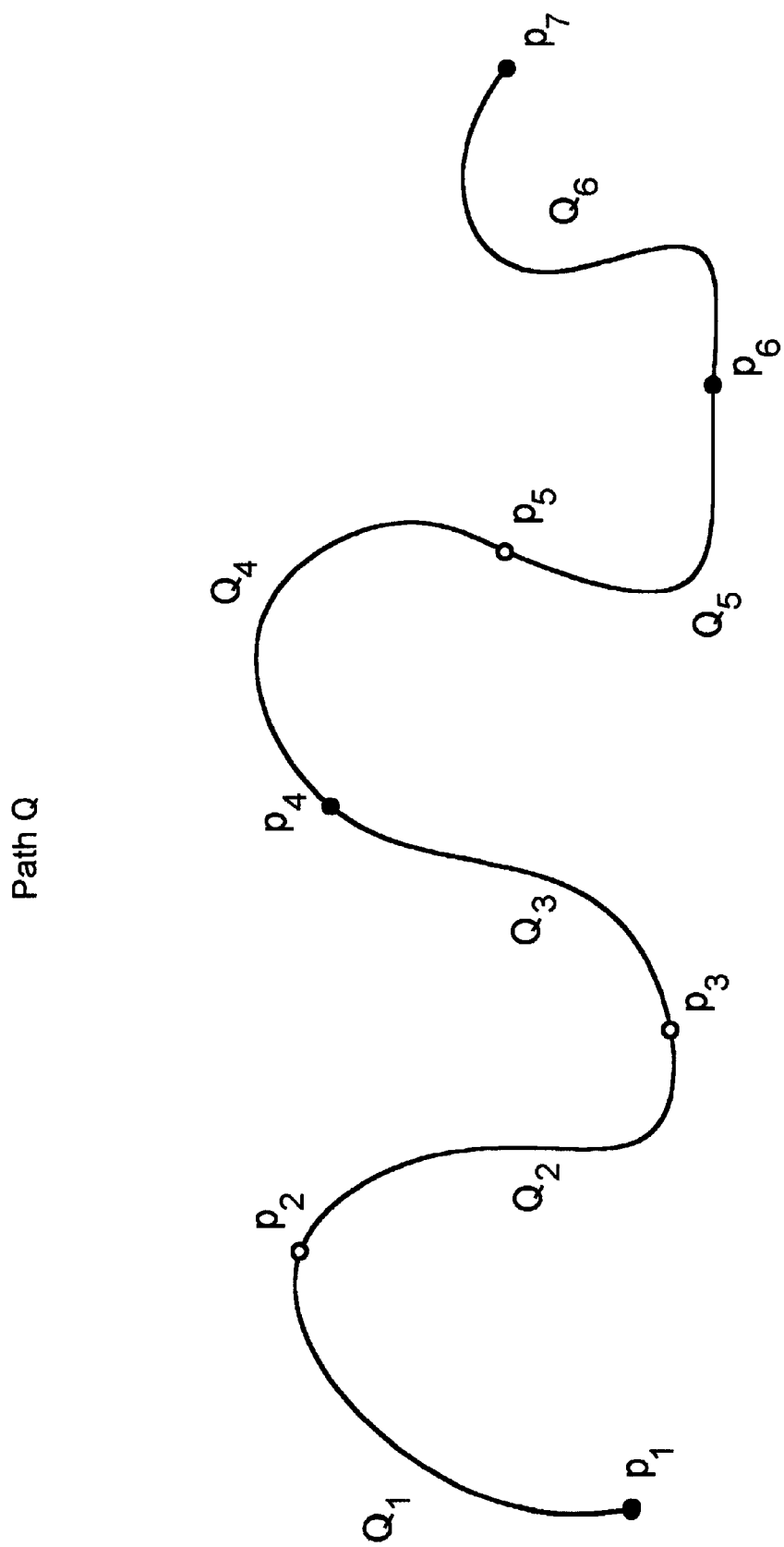
FIG. 8 is a graph of a path Q defined by four fixed keyframes and three floating keyframes.

These methods also apply to a path such as that shown in FIG. 8, in which floating and fixed keyframes are interspersed. The timing for each floating keyframe is determined by the attributes associated with the nearest fixed keyframe on each side of the floating keyframe.

Although the specification has described an embodiment for the animation of the position property of a layer, the methods discussed herein are equally applicable to animation of other n-dimensional layer properties such as color, size, mask shape, 3D object shape, 3D object position, and other arbitrary n-dimensional properties. For example, the user can animate a color change by specifying a path through color spaces such as RGB, CMYK, LUV, HLS, HVC, and YIQ.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 9:
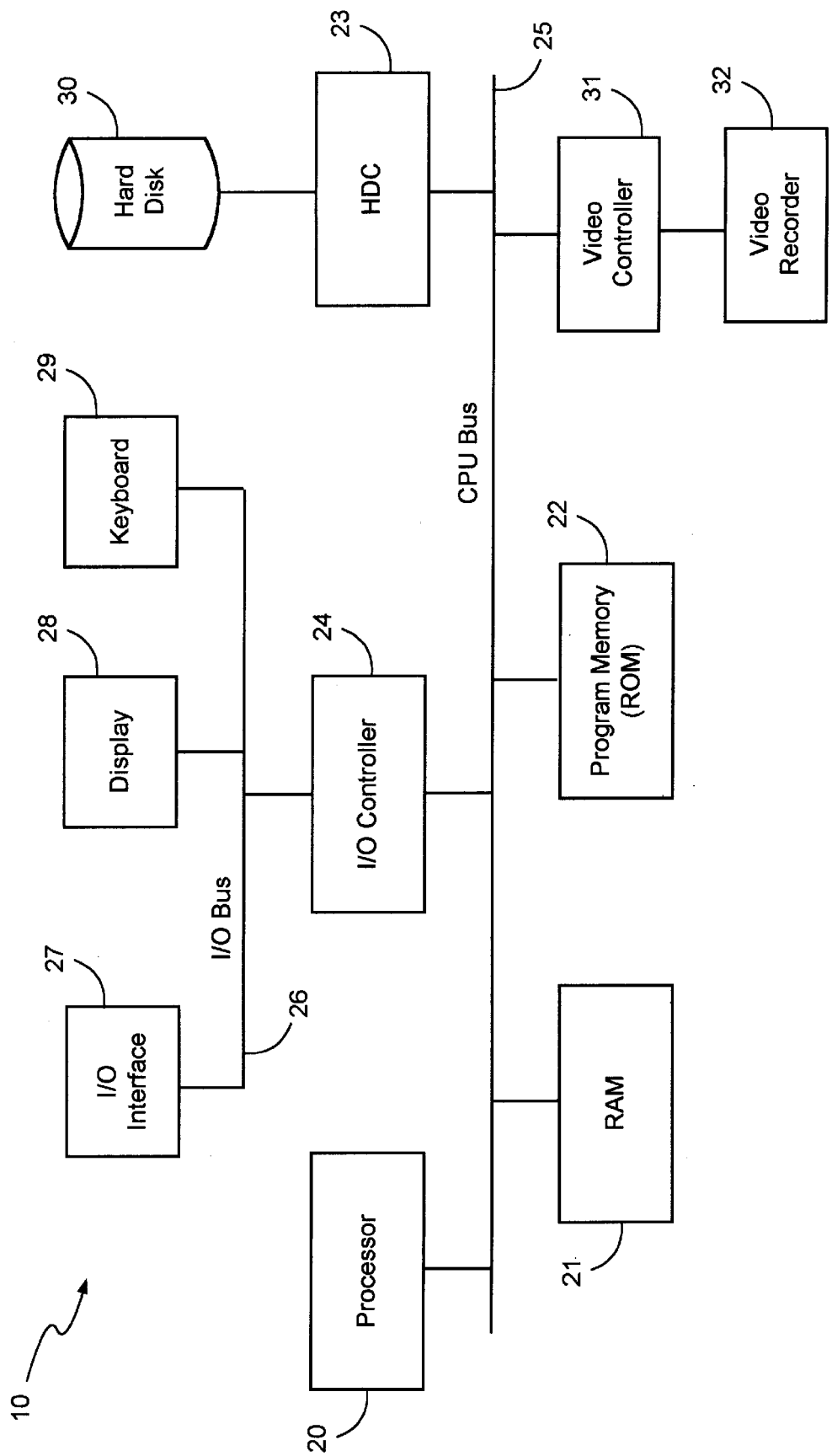
FIG. 9 is a schematic block diagram of a programmable computer suitable for executing computer programs according to the present invention.

By way of example, FIG. 9 shows a block diagram of a programmable information processing system (computer) 10. Computer 10 preferably includes a processor 20, random access memory (RAM) 21, a program memory 22 (preferably a writable read-only memory (ROM) such as a flash ROM), a hard drive controller 23, video controller 31 and an input/output (I/O) controller 24 coupled by a CPU bus 25.

Hard drive controller 23 is coupled to a hard disk 30, which may be used for storing application programs, such as After Effects, and data. Video controller 31 is coupled to video recorder 32, which may be used for storing and importing video footage and for writing final output. I/O controller 24 is coupled by means of an I/O bus 26 to an I/O interface 27. I/O interface 27 receives and transmits data in analog or digital form over communication links such as a serial link, local area network, wireless link, and parallel link. Also coupled to I/O bus 26 is a display 28 and a keyboard 29. Alternatively, separate connections (separate buses) may be used for I/O interface 27, display 28 and keyboard 29. Programmable processing system 10 may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory 22 or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The present invention has been described in terms of specific embodiments, which are illustrative of the invention and not to be construed as limiting.

What is claimed is:

1. A computer-implemented method of animating a graphics object along a path in a space, comprising the steps of:

receiving a time-ordered set of points defining the path including a first control point having a first time associated with it, a second control point having a second time associated with it, and one temporally intermediate control point having no specified time;

receiving a temporal function being a one dimensional function of time defining the rate of motion along the path between the first and second control points without regard for the distance between either of the first and second control points and the intermediate control point; and moving the object along the path according to the temporal function.

2. The method of claim 1, wherein the path lies in a color space.

3. The method of claim 1, wherein the path lies in a two-dimensional position space.

4. The method of claim 1, wherein the path lies in an n-dimensional mask shape space.

5. The method of claim 1, wherein the path lies in an n-dimensional 3D object shape space.

6. The method of claim 1, wherein the path lies in an arbitrary n-dimensional property space.

7. The method of claim 1, wherein the path lies in a three-dimensional position space.

8. A computer-implemented method of controlling the motion of a graphics object along a path in a space comprising the steps of:

receiving a time-ordered set of points defining the path including a first control point having a first time associated with it, a second control point having a second time associated with it, and one intermediate control point having a third intermediate time associated with it;

receiving a temporal function defined by the three control points for determining the rate of motion of the graphics object along the path between the first, second and intermediate control points;

decoupling the intermediate control point to float temporally by removing it from the temporal function, but retaining the control point in the definition of the spatial path;

redefining the temporal function based on the first and second control points without regard for the distance between either of the first and second control points and the intermediate control point; and moving the object along the path according to the redefined temporal function.

9. The method of claim 8 wherein the spatial path defines an animation sequence, and the temporal path defines a rate of change for the animation between the first and second control points.

10. A computer-implemented method of controlling the motion of a graphics object along a path in a space comprising the steps of:

receiving a time-ordered set of three or more control points on the path in the space;

receiving a subset of the control points defining a temporal function where the temporal function defines the rate of motion along the path without regard for the distances between control points; and moving the object along the path according to the temporal function.

11. A computer-implemented method of creating a floating keyframe, the floating keyframe being spatially located along an animation path between first and second control keyframes, where the first control keyframe has an associated time and the second keyframe has an associated second different time, the method comprising the steps of:

designating a point on the animation path without designating any associated time value such that the rate of motion along the animation Path is unaffected by the distance along the path between either of the first and second control keyframes and the point.

12. A memory device storing computer-readable instructions for aiding a computer to animate a graphics object along a path in a space, comprising:

instructions for receiving a time-ordered set of points defining the path including a first control point having a first time associated with it, a second control point having a second time associated with it, and one temporally intermediate control point having no specified time;

instructions for receiving a temporal function being a one dimensional function of time defining the rate of motion along the path between the first and second control points without regard for the distance between either of the first and second control points and the intermediate control point; and instructions for moving the object along the path according to the temporal function.

13. A computer-implemented method of controlling the motion of a graphics object along a path in a space comprising the steps of:

receiving a time-ordered set of points defining a spatial path including a first control point having a first time associated with it, and a second control point having a second time associated with it;

receiving a temporal function defining a rate the graphics object moves along the spatial path between the first and second control points;

receiving a third control point temporally floating between the first and second control points for further defining the spatial path, the third control point having no specific time associated therewith and not used in defining the temporal function;

redefining the spatial path based on the first, second and third control points without redefining the temporal function, such that the rate of motion along the path is independent of the distance between either of the first and second control points and the third control point; and moving the object along the path according to the redefined spatial function.

14. The method of claim 13 wherein the spatial path defines an animation sequence, and the temporal path defines a rate of change for the animation between the first and second control points.

* * * * *